United States Patent [19]
Matsumoto et al.

[11] Patent Number: 5,519,075
[45] Date of Patent: May 21, 1996

[54] POLYOXYMETHYLENE RESIN COMPOSITION

[76] Inventors: Masao Matsumoto, 195-10, Kamitomii, Kurashiki-shi, Okayama 710, Japan; Kenji Kagawa, Avenue de L'Aquilon 7, B-13, 1200 Woluwe St., Lambert, Brussels, Belgium; Toshiharu Seyama, 3-10-41, Kojimaogawa, Kurashiki-shi, Okayama 711, Japan

[21] Appl. No.: 244,871

[22] PCT Filed: Jan. 20, 1994

[86] PCT No.: PCT/JP94/00072

§ 371 Date: Jun. 10, 1994

§ 102(e) Date: Jun. 10, 1994

[87] PCT Pub. No.: WO94/17138

PCT Pub. Date: Aug. 4, 1993

[30] Foreign Application Priority Data

Jan. 20, 1993 [JP] Japan .................................. 5-023419

[51] Int. Cl.$^6$ .................................................. C08K 5/3492
[52] U.S. Cl. ........................ 524/100; 524/227; 524/378; 524/377; 524/353
[58] Field of Search ........................... 524/100, 231, 524/378, 377, 353, 227; 525/400, 401, 411

[56] References Cited

U.S. PATENT DOCUMENTS

| | | | |
|---|---|---|---|
| 3,103,499 | 9/1963 | Dolce et al. | 525/401 |
| 3,313,767 | 4/1967 | Berardinelli et al. | 524/100 |
| 3,314,918 | 4/1967 | Berardinelli et al. | 524/100 |
| 3,340,219 | 9/1967 | Stemmler | 524/227 |
| 3,795,715 | 3/1974 | Cherdron et al. | |
| 4,098,843 | 7/1978 | Johnson | 525/401 |
| 4,274,986 | 6/1981 | Ikenaga et al. | 524/910 |
| 4,351,916 | 9/1982 | Kohan | 524/377 |
| 4,731,397 | 3/1988 | Auerbach et al. | 524/100 |
| 4,855,365 | 8/1989 | Yamamoto et al. | 525/401 |
| 4,996,253 | 2/1991 | Mulholland | 524/100 |
| 5,011,890 | 4/1991 | Novak | 525/401 |
| 5,346,737 | 9/1994 | Takahashi et al. | 524/377 |

FOREIGN PATENT DOCUMENTS

| | | |
|---|---|---|
| 0117664 | 9/1984 | European Pat. Off. . |
| 0289142 | 11/1988 | European Pat. Off. . |
| 0308836 | 3/1989 | European Pat. Off. . |
| 0308835 | 3/1989 | European Pat. Off. . |
| 3011280 | 2/1981 | Germany . |
| 50-52166 | 5/1975 | Japan . |
| 50-103556 | 8/1975 | Japan . |
| 59-197452 | 11/1984 | Japan . |
| 59-217751 | 12/1984 | Japan . |
| 62-72743 | 4/1987 | Japan . |
| 63-33465 | 2/1988 | Japan . |
| 4-239049 | 8/1992 | Japan . |
| WO/9207033 | 4/1992 | WIPO . |

*Primary Examiner*—Veronica P. Hoke
*Attorney, Agent, or Firm*—Pennie & Edmonds

[57] ABSTRACT

The present invention provides a polyoxymethylene resin composition comprising:

(A) 100 parts by weight of a polyoxymethylene resin, (B) 0.1 to 2.0 parts by weight of a sterically hindered phenol compound, (C) 0.01 to 5.0 parts by weight of an olefin resin, (D) 0.1 to 2.0 parts by weight of specific polyalkylene glycol, (E) 0.01 to 5.0 parts by weight of a specific amide compound, (F) 0.01 to 2.0 parts by weight of melamine, and (G) 0 to 5.0 parts by weight of a polymer containing formaldehyde-reactive nitrogen.

The extrusion molded article obtained from the polyoxymethylene resin composition of the present invention has smaller whitened and void parts internally which, when not so small, are unfavorable with respect to physical properties and appearance of the molded article.

8 Claims, No Drawings

POLYOXYMETHYLENE RESIN COMPOSITION

TECHNICAL FIELD

The present invention relates to a novel polyoxymethylene resin composition and an extrusion molded article thereof. More particularly, it relates to a polyoxymethylene resin composition having excellent moldability and an extrusion molded article thereof.

BACKGROUND ART

Polyoxymethylene resins have been conventionally known as engineering resins having balanced mechanical properties and excellent moldability and have been used, in various fields, for parts of automobiles, parts of electric and electrical devices, industrial goods, toys and the like.

Of these, small-sized and mass-produced articles are mainly produced by an injection molding method. On the other hand, large-sized or non-mass-produced articles are produced by an extrusion molding method and the resultant articles are usually subjected to a secondary process such as cutting. The main articles produced by the extrusion molding method include an article in the shape of a round bar having a diameter of 10 to 200 mm (hereinafter a rod stock), an article in the shape of a sheet having a thickness of 10 to 100 mm (hereinafter a thick sheet) and the like.

When molded articles such as a rod stock and a thick sheet are produced with a polyoxymethylene resin by an extrusion molding method, the resultant articles are not satisfactory, that is, the moldability which the polyoxymethylene inherently possesses cannot provide desirable molded articles. Inside the resultant articles, a part whose color tone is different from that of the peripheral part (hereinafter a whitened part) or a void part comprising microvoids and the like occurs. These parts are unfavorable in view of physical properties and appearance of the molded articles. For example, in case of a screw prepared from a rod stock by cutting, its mechanical strength such as flexural strength, tensile strength and impact strength are reduced at a void part when the void part is large. As a result, the screw is easy to break. In order to solve such problems, improvement in reducing the occurrence of the void part has been awaited.

There has not been any prior art trying to solve the above problems of whitened parts or void parts occurring in a rod stock, etc. Japanese Unexamined Patent Publication No. 33465/1988 discloses a molded article in the shape of a rod stock produced from a resin composition which is prepared by adding ultra high molecular weight polyethylene to a polyoxymethylene resin. However, the purpose of this invention is to improve the resin composition so as not to slip on the screw of the extruder at molding. Therefore, the whitened part and the void part occurring inside the molded article cannot be sufficiently improved.

Further, in order to improve the physical properties of the polyoxymethylene resin, various attempts have been carried out. Of these, several attempts to add a polyolefin and a sterically hindered phenol compound to a polyoxymethylene resin have been proposed. For example, International Patent Publication No. WO92-07033 discloses a composition that comprises a polyoxymethylene polymer and linear low density polyethylene for improving elongation and also describes how sterically hindered phenols may be incorporated. Japanese Unexamined Patent Publication No. 52166/1975 discloses, in the Example, a method for incorporating polyoxymethylenediacetate, fine powder low density polyethylene, 2,2'-methylene-bis-(4-methyl-6-t-butylphenol), a polyamide copolymer and isoeicosanolacetate. Japanese Unexamined Patent Publication No. 103556/1975 discloses, in the Example, a method for incorporating polyoxymethylene diacetate, low density polyethylene, 2,2'-methylene-bis-(4-methyl-6-t-butylphenol), a polyamide copolymer and isostearyl alcohol polyethylene oxide. Japanese Unexamined Patent Publication No. 197452/1984 discloses, in the Example, a method for incorporating a polyacetal ethylene copolymer, 2,2'-methylene-bis-(4-methyl-6-t-butylphenol), nylon 6-6 and an acetal block copolymer.

According to these methods, rub resistance, hard wearing property and impact resistance are improved to a certain degree. However, a whitened part or a void part occurring inside the molded article, which is unfavarable in view of physical properties and appearance of the molded article, is not sufficiently lessened.

The present invention has been conducted under such circumstances to provide a polyoxymethylene resin composition and an extrusion molded article thereof. The extrusion molded article obtained from the polyoxymethylene resin composition of the present invention has smaller whitened and void parts internally which, when not so small, are unfavorable in respect of the physical properties and appearance.

Disclosure of the Invention

The present inventors have made intensive and extensive studies to develop a polyoxymethylene resin composition excellent in moldability. As a result, they have accomplished the present invention.

The present invention provides a polyoxymethylene resin composition comprising:

(A) 100 parts by weight of a polyoxymethylene resin, (B) 0.1 to 2.0 parts by weight of a sterically hindered phenol compound, (C) 0.01 to 5.0 parts by weight of an olefin resin, (D) 0.1 to 2.0 parts by weight of a polyalkylene glycol represented by Formula (1):

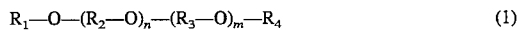

$$R_1-O-(R_2-O)_n-(R_3-O)_m-R_4 \quad (1)$$

wherein $R_1$ and $R_4$ represent hydrogen, alkyl groups having 1 to 30 carbon atoms, acyl groups having 1 to 30 carbon atoms and alkylphenyl groups having 1 to 30 carbon atoms; $R_2$ and $R_3$ represent an alkylene group having 2 to 6 carbon atoms; and n and m represent integers satisfying the condition of being 1 or more and n+m<1000.

(E) 0.01 to 5.0 parts by weight of an amide compound represented by Formula (2):

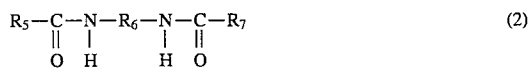

$$R_5-\underset{\underset{O}{\|}}{C}-\underset{\underset{H}{\phantom{|}}}{N}-R_6-\underset{\underset{H}{\phantom{|}}}{N}-\underset{\underset{O}{\|}}{C}-R_7 \quad (2)$$

wherein $R_5$ and $R_7$ represent an alkyl group having 1 to 30 carbon atoms; and $R_6$ represents an alkylene group having 2 to 10 carbon atoms.

(F) 0.01 to 2.0 parts by weight of melamine, and (G) 0 to 5 parts by weight of a polymer containing formaldehyde-reactive nitrogen.

Further, the present invention provides an extrusion molded article comprising the polyoxymethylene resin composition.

Now, the present invention is described in more detail.

In the present invention, a polyoxymethylene resin used as Component (A) includes:

(a) an oxymethylene homopolymer comprising substantially oxymethylene units obtained by polymerizing a formaldehyde monomer or a cyclic oligomer such as trioxane and tetraoxane;

(b) an oxymethylene copolymer containing 0.1 to 20% by weight of oxyalkylene units having 2 to 8 carbon atoms, which is obtained by copolymerizing a formaldehyde monomer or a cyclic oligomer such as trioxane and tetraoxane with a cyclic ether such as ethylene oxide, propylene oxide, epichlorohydrin, 1,3-dioxolane, formal of glycol and formal of diglycol;

(c) a branched oxymethylene homopolymer obtained by polymerizing a formaldehyde monomer or a cyclic oligomer such as trioxane and tetraoxane in the presence of compounds having, in a molecule, a plurality of functional groups such as a hydroxyl group, a carboxyl group, an amino group, an anhydride group, an alkoxy group and an epoxy group;

(d) a branched oxymethylene copolymer obtained by copolymerizing a formaldehyde monomer or a cyclic oligomer such as trioxane and tetraoxane with a cyclic ether such as ethylene oxide, propylene oxide, epichlorohydrin, 1,3-dioxolane, formal of glycol and formal of diglycol in the presence of compounds having, in a molecule, a plurality of functional groups such as a hydroxyl group, a carboxyl group, an amino group, an anhydride group, an alkoxy group and an epoxy group;

(e) a block copolymer of an oxymethylene homopolymer obtained by polymerizing a formaldehyde monomer or a cyclic oligomer such as trioxane and tetraoxane in the presence of styrene, ester, amide or urethane type elastomer having functional groups such as a hydroxyl group, a carboxyl group, an amino group, an anhydride group, an alkoxy group and an epoxy group at one end or at both ends; and (f) a block copolymer of an oxymethylene copolymer obtained by copolymerizing a formaldehyde monomer or a cyclic oligomer such as trioxane and tetraoxane with a cyclic ether such as ethylene oxide, propylene oxide, epichlorohydrin, 1,3-dioxolane, formal of glycol and formal of diglycol in the presence of styrene, ester, amide or urethane type elastomers having functional groups such as a hydroxyl group, a carboxyl group, an amino group, an anhydride group, an alkoxy group and an epoxy group.

Of these, an oxymethylene copolymer, a branched oxymethylene copolymer, and a block copolymer of an oxymethylene copolymer as described in (b), (d) and (f) above, respectively, are preferred. Particularly, an oxymethylene copolymer described in (b) is more preferred.

Sterically hindered phenol compounds used as Component (B) in the present invention include, for example, triethyleneglycol-bis[3-(3-t-butyl-5-methyl-4 -hydroxyphenyl)propionate], 1,6-hexanediol-bis[3-(3,5-di-t-butyl-4-hydroxyphenyl)propionate], pentaerythrityl-tetrakis[3-(3,5-di-t-butyl-4-hydroxyphenyl)propionate], octadecyl-3-(3,5-di-t-butyl-4-hydroxyphenyl)propionate, N,N'-hexamethylene-bis(3,5-di-t-butyl-4-hydroxy-hydrocinnamide), 3,5-di-t-butyl-4-hydroxy-benzylphosphonate-diethylester, 1,3,5-trimethyl-2,4,6-tris(3,5-di-t-butyl-4-hydroxybenzyl)benzene, 3,9-bis[2-[3-(3-t-butyl-4-hydroxy-5-methylphenyl)propionyloxy]-1,1-dimethylethyl] -2,4,8,10-tetraoxaspiro[5,5]undecane, 1,6-hexanediol-bis[3-(3-t-butyl-5-methyl-4-hydroxyphenyl)propionate], pentaerythritol-tetrakis[3(3-t-butyl-5-methyl-4-hydroxyphenyl)propionate], octadecyl-3-(3-t-butyl-5-methyl-4-hydroxyphenyl)propionate and N,N'-hexamethylenebis(3-t-butyl-5-methyl-4-hydroxy-hydrocinnamide). Of these, triethyleneglycol-bis[3-(3-t-butyl-5-methyl-4-hydroxyphenyl)propionate], pentaerythrityl-tetrakis[3-(3,5-di-t-butyl-4-hydroxyphenyl)propionate], N,N'-hexamethylene-bis(3,5-di-t-butyl-4-hydroxy-hydrocinnamide), 3,9-bis[2-[3-(3-t-butyl-4-hydroxy-5-methylphenyl)propionyloxy]-1,1-dimethylethyl] -2,4,8,10-tetraoxaspiro[5,5]undecane and 1,6-hexanediol-bis[3-(3-t-butyl-5-methyl-4-hydroxyphenyl)propionate] are preferred. Particularly, triethyleneglycol-bis [3-(3-t-butyl-5-methyl-4hydroxyphenyl)propionate] and pentaerythrityl-tetrakis[3-(3,5-di-t-butyl-4-hydroxyphenyl)propionate] are more preferred. These sterically hindered compounds are used individually or in combination.

The amount of the sterically hindered phenol compound of the present composition should be, based on the amount of the polyoxymethylene resin, in the range of 0.1 to 2.0 parts by weight. When the amount is less than 0.1 part by weight, the void part and the whitened part are not sufficiently reduced. When the amount is more than 2.0 parts by weight, the molded article becomes markedly colored during the residence of the resin at molding of the resin. Such a colored molded article is not suitable for practical use. Therefore, in order to exhibit the effect of the present invention sufficiently, the amount of the sterically hindered phenol compound is, based on the amount of the polyoxymethylene resin, in the range of 0.1 to 2.0 parts by weight, preferably in the range of 0.2 to 1.0 part by weight.

It is known that the sterically hindered phenol compound exhibits its effect as a good antioxidant so that it is often used in a polyoxymethylene resin. By combining the sterically hindered phenol compound with the components of the present invention according to the composition of the present invention, the purpose of the present invention, i.e., the effect of reducing the void and whitened parts, is unexpectedly attained.

An olefin resin is employed as Component (C) for the present composition. The olefin resin refers to a polyolefin or a modified polyolefin.

The polyolefin includes, for example, a homopolymer such as high density polyethylene, low density polyethylene, polypropylene, polybutene-1, poly-4-methylpentene-1 and a copolymer of an olefin and a vinyl compound.

Of these homopolymers, high density polyethylene and low density polyethylene are preferred. High density polyethylene and low density polyethylene having various molecular weights are used for the present invention. The molecular weight is preferably in the range of 10,000 to 500,000, more preferably in the range of 20,000 to 300,000.

The copolymer of an olefin and a vinyl copolymer includes, for example, a copolymer of an olefin and another olefin, a copolymer of an olefin such as ethylene, propylene and butene and a vinyl compound such as vinyl acetate, vinyl formate, methyl acrylate, ethyl acrylate, butyl acrylate, methyl methacrylate, ethyl methacrylate, butyl methacrylate, acrylonitrile, methacrylonitrile, methylvinyl ether, ethylvinyl ether, butylvinyl ether and isobutylvinyl ether. Of these, a copolymer of ethylene and the above-listed vinyl compounds is preferred.

The modified polyolefin is prepared by reacting a polyolefin with a reaction accelerator such as a peroxide followed by the grafting of polar groups such as carboxyl groups. The modified polyolefin includes, for example, a polyolefin modified by grafting an unsaturated organic acid such as maleic acid, itaconic acid, acrylic acid and methacrylic acid, an anhydride of an unsaturated organic acid such as maleic anhydride, itaconic anhydride and citraconic anhydride, an ester of an unsaturated organic acid such as monomethyl maleate and methyl acrylate, an amide of an unsaturated organic acid such as monoamide fumarate and amide acrylate and an imide of an unsaturated organic acid such as imide itaconate to a polyolefin.

These olefin resins may be used individually or in combination.

The amount of the olefin resin of the present composition should be, based on the amount of the polyoxymethylene resin, in the range of 0.01 to 5.0 parts by weight. When the amount is less than 0.01 part by weight, the void part and the whitened part are not sufficiently reduced. When the amount is more than 5.0 parts by weight, the inherent mechanical properties of the polyoxymethylene resin are reduced, which is a problem in practical use. Therefore, in order to exhibit the effect of the present invention sufficiently, the amount of the olefin resin is, based on the amount of the polyoxymethylene resin, in the range of 0.01 to 5.0 parts by weight, preferably in the range of 0.02 to 2.0 parts by weight, more preferably in the range of 0.05 to 1.0 part by weight.

The polyalkylene glycol represented by Formula (1) which is used as Component (D) of the present composition includes, as a first group, a polycondensate obtained by using an alkylene glycol as a monomer, e.g., polyethylene glycol, polypropylene glycol or a polyethylene-glycol-polypropylene-glycol block polymer. The polymerization mole number is preferably in the range of 5 to 1,000, more preferably in the range of 10 to 500. A second group is an ether compound of the first group and an aliphatic alcohol, such as polyethylene glycol oleyl ether (ethylene oxide polymerization mole number of 5 to 50), polyethylene glycol cetyl ether (ethylene oxide polymerization mole number of 5 to 20), polyethylene glycol stearyl ether (ethylene oxide polymerization mole number of 5 to 30), polyethylene glycol lauryl ether (ethylene oxide polymerization mole number of 5 to 30), polyethylene glycol tridecylether (ethylene oxide polymerization mole number of 5 to 30), polyethylene glycol nonylphenyl ether (ethylene oxide polymerization mole number of 2 to 100) and polyethylene glycol octylphenyl ether (ethylene oxide polymerization mole number of 4 to 50). A third group is an ether compound of the first group and a higher fatty acid such as polyethylene glycol monolaurate (ethylene oxide polymerization mole number of 2 to 30), polyethylene glycol monostearate (ethylene oxide polymerization mole number of 2 to 50) and polyethylene glycol monooleate (ethylene oxide polymerization mole number of 2 to 10). Of these polyalkylene glycols, the polyalkylene glycol in the first group is preferred. The polyalkylene glycols may be used individually or in combination.

The amount of the polyalkylene glycol of the present composition should be, based on the amount of the polyoxymethylene resin, in the range of 0.1 to 2.0 parts by weight. When the amount is less than 0.1 part by weight, the void part and the whitened part are not sufficiently reduced. When the amount is more than 2.0 parts by weight, the resin surges in the extruder. This surging unpreferably causes a reduction of productivity so that this amount, more than 2.0 parts by weight, is not preferred. In order to exhibit the effect of the present invention sufficiently, the amount of the polyalkylene glycol is, based on the amount of the polyoxymethylene resin, in the range of 0.1 to 2.0 parts by weight, preferably in the range of 0.1 to 1.0 part by weight.

The amide compound represented by Formula (2) which is used as Component (E) of the present composition includes, for example, ethylene bis-laurylamide, ethylene bis-stearylamide, ethylene bis-oleylamide. Of these, ethylene bis-stearylamide is preferred. These amide compounds may be used individually or in combination.

The amount of the amide compound of the present composition should be, based on the amount of the polyoxymethylene resin, in the range of 0.01 to 5.0 parts by weight. When the amount is less than 0.01 part by weight, the void part and the whitened part are not sufficiently reduced. When the amount is more than 5.0 parts by weight, the resin surges in the extruder. This surging unpreferably causes a reduction of productivity so that this amount, more than 5.0 parts by weight, is not preferred. In order to exhibit the effect of the present invention sufficiently, the amount of the amide compound is, based on the amount of the polyoxymethylene resin, in the range of 0.01 to 5.0 parts by weight, preferably in the range of 0.01 to 2.0 parts by weight.

As Component (F), the composition of the present invention employs melamine. The amount should be selected from the range of 0.01 to 2.0 parts by weight based on the amount of the polyoxymethylene resin. When the amount is less than 0.01 part by weight, the void part and the whitened part are not sufficiently reduced. When the amount is more than 2.0 parts by weight, the moldability of the resin is reduced. Therefore, in order to exhibit the effect of the present invention sufficiently, the amount of the melamine is, based on the amount of the polyoxymethylene resin, in the range of 0.01 to 2.0 parts by weight, preferably in the range of 0.01 to 0.5 part by weight.

A polymer containing formaldehyde-reactive nitrogen which is used for Component (G) of the present composition refers to a polymer having active hydrogen on a nitrogen atom.

Examples of Component (G) include a polyamide resin, a poly($\beta$-alanine) copolymer obtained by polymerizing acrylamide and a derivative thereof or polymerizing acrylamide, a derivative thereof and other vinyl monomers in the presence of a metal alcoholate, a polymer obtained by polymerizing acrylamide and a derivative thereof or polymerizing acrylamide, a derivative thereof and other vinyl monomers in the presence of a radical polymerization catalyst and a polymer having nitrogen-containing groups such as amine, amide, urea and urethane.

The detailed description of the method for preparing the above poly($\beta$-alanine) copolymer is disclosed in Japanese Unexamined Patent Publication Nos. 118328/1988 and 234729/1991. The detailed description of the method for preparing the above polymer obtained by a polymerization in the presence of a radical polymerization catalyst is disclosed in Japanese Unexamined Patent Publication No. 28260/1991.

Examples of the polyamide resin include nylon 4-6, nylon 6, nylon 6-6, nylon 6-10, nylon 6-12, nylon 12 and copolymers thereof such as nylon 6/6-6/6-10 and nylon 6/6-12.

Of these, a poly($\beta$-alanine) copolymer is particularly preferred. The copolymer has a particle diameter of 10 $\mu$m or less, preferably 6 $\mu$m or less, more preferably 4 $\mu$m or less. These polyamide compounds may be used individually or in combination.

The amount of Component (G) of the present composition should be, based on the amount of the polyoxymethylene resin, in the range of 0 to 5.0 parts by weight. When the amount is more than 5.0 parts by weight, the resultant is unpreferably colored during the residence of Component (G) at molding. Therefore, in order to exhibit the effect of the present invention sufficiently, the amount of Component (G) is, based on the amount of the polyoxymethylene resin, in the range of 0 to 1.0 part by weight, preferably in the range of 0.01 to 1.0 part by weight.

The above value, "part by weight", of the amount is based on 100 parts by weight of the polyoxymethylene resin.

Each determined amount of Components (A), (B), (C), (D), (E) and (F), and if necessary (G), of the polyoxymethylene resin composition of the present invention are uniformly mixed by melt kneading at 200° C. or more.

Concretely, Components (B), (C), (D), (E) and (F), and if necessary (G), may be added to Component (A) of the polyoxymethylene resin at one time, blended with a Henschel mixer and the like and then melt kneaded with a single or twin screw extruder and the like at a maximum resin temperature of 200° C. or more; or Components (A), (B), (C), (D), (E) and (F), and if necessary (G), may be fed into the extruder at one time without preliminary blending to melt knead at the maximum resin temperature of 200° C. or more.

When an exruder is employed for melt kneading, the maximum resin temperature of the present invention refers to an equilibrium temperature of the resin which is just extruded from the extruder. When a batch type mixer such as a kneader and a roll mill is employed, the maximum resin temperature refers to an equilibrium temperature of the resin melt kneaded under a certain condition, which temperature is recorded by a thermometer set in a mixer.

Further, when an extruder is employed, the L/D of screw size is desirably 20 or more in order to sufficiently conduct mixing. Components (A), (B), (C), (D), (E), (F) and (G) to be used for preparing the composition of the present invention may be used in the form of liquid, pellet or powder.

The extrusion molded article of the present composition is obtained by using an apparatus wherein the desired mold is connected to a single or twin screw extruder of general utility and a roller, for stopping the extruded molded article, is set near the exit of the mold.

The extrusion molded article of the present composition includes, for example, a square bar, a rod stock having a diameter of about 10 to about 200 mm and a thick sheet having a thickness of about 10 to about 100 mm.

Various additives which are conventionally used as plastic additives are mixed with the composition of the present invention in the range where the purpose of the present invention is not obstructed.

The extrusion molded article obtained from the present composition has markedly lessened whitened and void parts occurring inside the molded article. The whitened and void parts are unfavorable in view of physical properties and appearance. Further, secondary articles such as a screw and a pulley, which have stable mechanical strength such as flexural strength, tensile strength and impact strength, are obtained from the above molded article.

The composition of the present invention can be used not only for extrusion molding but also for injection molding, blow molding and the like.

BEST MODE FOR CARRYING OUT THE INVENTION

[EXAMPLE]

The following Examples are provided to illustrate the invention without limiting the scope thereof.

The evaluation methods are explained below.
[Method for preparing an extrusion molded article and evaluating moldability thereof: whitening and void]

Pellets were dried at 80° C. for 3 hours and poured in a mold having a length of 1 meter and a diameter of 140 mm at a temperature of 30° C. by using a single screw extruder having L/D of 25 whose cylinder temperature, screw speed and discharge speed were set at 180° C., 20 rpm and 5 kg/hr, respectively, to obtain a 2.5 meter long molded article in the shape of a round bar under a resin pressure of 7 to 9 kg/cm$^2$. A 1.5 cm thick circular sample was cut out from the resultant molded article at the point of 1.5 meters from the end of the article. The size of the void part at the center was measured and the whitened part around the void part was visually observed.

[Measurement of tensile strength]

A 135 mm×10 mm×3 mm board was cut from the above circular sample so that the center of the board may correspond to the center of the sample. The tensile strength was measured according to ASTM-D368.

Each component employed in the Examples is as follows:

(1) Component (A)
  A1: polyoxymethylene copolymer having a melt index of 2.5 g/10 min. and a melting point of 163° C.
  A2: polyoxymethylene homopolymer having a melt index of 2.0 g/10 min. and a melting point of 175° C.

(2) Component (B)
  B1: triethyleneglycol-bis[3-(3-t-butyl-5-methyl-4-t-butyl-4-hydroxyphenyl)propionate]
  B2: pentaerythrityl-tetrakis[3-(3,5-di-t-butyl-4-hydroxyphenyl)propionate]
  B3: N,N'-hexamethylene-bis(3,5-di-t-butyl-4-hydroxyhydrocinnamide)

(3) Component (C)
  C1: polypropylene having a melt index of 8.0 g/10 min. and a Vicat softening temperature of 102° C.
  C2: high density polyethylene having a melt index of 9.0 g/10 min. and a Vicat softening temperature of 120° C.
  C3: low density polyethylene having a melt index of 6.5 g/10 min. and a Vicat softening temperature of 86° C.
  C4: low density polyethylene having a melt index of 4.0 g/10 min. and a Vicat softening temperature of 90° C.

(4) Component (D)
  D1: polyethylene glycol monostearyl ether (ethylene oxide polymerization mole number of 15)
  D2: polyethylene glycol (average molecular weight of 6000)
  D3: polyethylene glycol (average molecular weight of 1000)
  D4: polypropyrene glycol (average molecular weight of 2000)
  D5: polyethylene glycol monononyl phenyl ether (ethylene oxide polymerization mole number of 30)
  D6: polyethylene glycol monostearate (ethylene oxide polymerization mole number of 40)
  D7: polyethylene glycol (average molecular weight of 10000)
  D8: polypropyrene glycol (average molecular weight of 6000)

(5) Component (E)
  E1: ethylene bis-stearylamide
  E2: ethylene bis-laurylamide
  E3: ethylene bis-oleylamide (6) Component (G)
  G1: poly(β-alanine) having reducing viscosity of 3.7 and a particle diameter of 2.5 μm The melt index and the Vicat softening temperature were measured according to ASTM D-1238-57T (condition E) and ASTM D1525, respectively.

[Examples 1 to 7]

The components shown in Tables 1 and 2 were preliminarily blended in a Henschel mixer and melt kneaded under the conditions of a screw speed of 50 rpm, a discharge speed of 30 kg/hr and a maximum resin temperature of 225° to 235° C. using a twin screw extruder having L/D of 30 and a cylinder temperature of 210° C. The extruded melt strands were cooled and pelletized.

An extrusion molded article was prepared from each composition and the moldability was evaluated. The results are shown in Tables 1 and 2.

TABLE 1

|  | Example 1 | Example 2 | Example 3 | Example 4 |
|---|---|---|---|---|
| Component (A) | A1: 100 | A2: 100 | A1: 100 | A1: 100 |
| Component (B) | B1: 0.2 | B2: 0.3 | B2: 0.3 | B3: 0.3 |
| Component (C) | C1: 0.05 | C2: 0.1 | C3: 0.1 | C4: 1.0 |
| Component (D) | D1: 0.5 | D2: 0.5 | D3: 0.5 | D4: 0.5 |
| Component (E) | E1: 0.2 | E2: 0.05 | E1: 0.1 | E1: 0.1 |
| Component (F) | 0.05 | 0.02 | 0.05 | 0.05 |
| Component (G) | — | G1: 0.1 | — | — |
| Extrusion moldability |  |  |  |  |
| Void shape in the center of a round bar (mm) | 3 | 2 | 4 | 3 |
| Whitening | None | None | None | None |
| Tensile Strength (Kg/cm$^2$) | 562 | 605 | 507 | 575 |

TABLE 2

|  | Example 5 | Example 6 | Example 7 | Example 8 |
|---|---|---|---|---|
| Component (A) | A1: 100 | A2: 100 | A1: 100 | A1: 100 |
| Component (B) | B1: 0.2 | B1: 0.3 | B1: 0.2 | B1: 0.3 |
| Component (C) | C3: 0.05 | C3: 0.1 | C4: 0.05 | C3: 0.1 |
| Component (D) | D5: 0.5 | D6: 0.5 | D2: 0.5 | D3: 0.5 |
| Component (E) | E3: 0.15 | E1: 0.05 | E3: 0.1 | E1: 0.1 |
| Component (F) | 0.05 | 0.02 | 0.1 | 0.05 |
| Component (G) | — | — | — | — |
| Extrusion moldability |  |  |  |  |
| Void shape in the center of a round bar (mm) | 3 | 4 | 3 | 3 |
| Whitening | None | None | None | None |
| Tensile Strength (Kg/cm$^2$) | 543 | 516 | 555 | 569 |

[Comparative Examples 1 to 9]

The same procedure as in the Examples was conducted except that the components shown in Tables 3 to 5 were used. The results are shown in Tables 3 to 5.

TABLE 3

|  | Comparative Example 1 | Comparative Example 2 | Comparative Example 3 | Comparative Example 4 |
|---|---|---|---|---|
| Component (A) | A1: 100 | A1: 100 | A2: 100 | A1: 100 |
| Component (B) | — | B2: 0.3 | — | B1: 0.3 |
| Component (C) | — | — | C3: 0.1 | C4: 0.05 |
| Component (D) | — | — | — | — |
| Component (E) | — | — | — | — |
| Component (F) | — | — | — | — |
| Component (G) | — | — | — | — |
| Extrusion moldability |  |  |  |  |
| Void shape in the center of a round bar (mm) | *1 | 15 | *1 | 12 |
| Whitening | — | Whitened | — | Whitened |
| Tensile Strength (Kg/cm$^2$) | — | 100 or less | — | 100 or less |

*1: Strong smell of formaldehyde due to decompsition developed and the resin could not be extruded.

TABLE 4

|  | Comparative Example 1 | Comparative Example 2 | Comparative Example 3 | Comparative Example 4 |
|---|---|---|---|---|
| Component (A) | A1: 100 | A1: 100 | A1: 100 | A1: 100 |
| Component (B) | B1: 5.0 | B1: 0.3 | B1: 0.3 | B1: 0.2 |
| Component (C) | C3: 0.05 | C3: 7.0 | C3: 0.1 | Ce: 0.05 |
| Component (D) | D7: 0.5 | D7: 6.0 | D3: 0.5 | D5: 0.5 |
| Component (E) | — | E1: 0.1 | E1: 0.1 | E3: 0.15 |
| Component (F) | — | — | — | — |
| Component (G) | — | — | — | — |

TABLE 4-continued

|  | Comparative Example 1 | Comparative Example 2 | Comparative Example 3 | Comparative Example 4 |
|---|---|---|---|---|
| Other Component (H) | — | — | — | — |
| Extrusion moldability | | | | |
| Void shape in the center of a round bar (mm) | *2 | *3 | 7 | 5 |
| Whitening | | | None | None |
| Tensile Strength (Kg/cm²) | — | — | 100 or less | 351 |

*2: The molded article became yellow and was not suitable for practical use.
*3: The additives peeled off in the form of layers and molded article was not suitable for practical use.

TABLE 5

|  | Comparative Example 9 |
|---|---|
| Component (A) | A1: 100 |
| Component (B) | B2: 0.3 |
| Component (C) | — |
| Component (D) | D6: 0.5 |
| Component (E) | E1: 0.1 |
| Component (F) | 0.05 |
| Compoennt (G) | — |
| Other Component (H) | — |
| Extrusion moldability | |
| Void shape in the center of a round bar (mm) | 14 |
| Whitening | Whitened |
| Tensile Strength (Kg/cm²) | 100 or less |

[Industrial Applicability]

The extrusion molded article obtained from the polyoxymethylene resin composition of the present invention has smaller whitened and void parts internally which, when not so small, are unfavorable with respect to physical properties and appearance of the molded article.

What is claimed is:

1. An extrusion molded article of a polyoxymethylene resin composition comprising:

(A) 100 parts by weight of a polyoxymethylene resin, (B) 0.1 to 2.0 parts by weight of a sterically hindered phenol compound, (C) 0.01 to 5.0 parts by weight of an olefin resin, (D) 0.1 to 2.0 parts by weight of polyalkylene glycol represented by Formula (1):

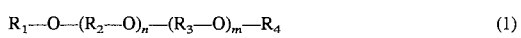

$$R_1-O-(R_2-O)_n-(R_3-O)_m-R_4 \quad (1)$$

wherein $R_1$ and $R_4$ represent hydrogen, alkyl groups having 1 to 30 carbon atoms, acyl groups having 1 to 30 carbon atoms; $R_2$ and $R_3$ represent alkylene groups having 2 to 6 carbon atoms; and n and m represent integers satisfying the condition of being 1 or more and n+m<1000, (E) 0.01 to 5.0 parts by weight of an amide compound represented by Formula (2):

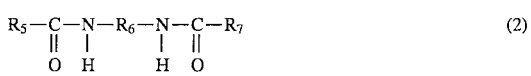

$$R_5-\underset{O}{\underset{\|}{C}}-\underset{H}{\underset{|}{N}}-R_6-\underset{H}{\underset{|}{N}}-\underset{O}{\underset{\|}{C}}-R_7 \quad (2)$$

wherein $R_5$ and $R_7$ represent alkyl groups having 1 to 30 carbon atoms; and $R_6$ represents an alkylene group having 2 to 10 carbon atoms, (F) 0.01 to 2.0 parts by weight of melamine, and (G) 0 to 5.0 parts by weight of a polymer containing formaldehyde-reactive nitrogen.

2. The extrusion molded article according to claim 1, is in the shape of a bar or a sheet.

3. The extrusion molded article according to claim 1 or 2, wherein:

the amount of the sterically hindered phenol compound (B) is 0.2 to 1.0 part by weight, the amount of the olefin resin (C) is 0.02 to 2.0 parts by weight, the amount of the polyalkylene glycol (D) represented by Formula (1) is 0.1 to 1.0 part by weight, the amount of the amide compound (E) represented by Formula (2) is 0.01 to 2.0 parts by weight, the amount of the melamine (F) is 0.01 to 0.5 part by weight, and the amount of the polymer (G) containing formaldehyde-reactive nitrogen is 0 to 1.0 part by weight.

4. The extrusion molded article according to claim 1 or 2, wherein at least one of the sterically hindered phenol compounds (B) is selected from the group consisting of triethyleneglycol-bis[3-(3-t-butyl-5-methyl-4-hydroxyphenyl-)propionate] and pentaerythrityl-tetrakis[3-(3,5-di-t-butyl-4-hydroxyphenyl)propionate].

5. The extrusion molded article according to claim 1 or 2, wherein the olefin resin (C) is high or low density polyethylene having a molecular weight of 10,000 to 500,000.

6. The extrusion molded article according to claim 1 or 2, wherein the polyalkylene glycol (D) represented by Formula (1) is a polycondensate obtained by using alkylene glycol as a monomer.

7. The extrusion molded article according to claim 1 or 2, wherein at least one of the amide compounds (E) represented by Formula (2) is selected from the group consisting of ethylene bis-laurylamide, ethylene bis-stearylamide and ethylene bis-oleylamide.

8. The extrusion molded article according to claim 1 or 2, wherein the polymer (G) containing formaldehyde-reactive nitrogen is a poly(β-alanine) copolymer.

* * * * *